US012756225B2

(12) United States Patent
Nakamura

(10) Patent No.: US 12,756,225 B2
(45) Date of Patent: Oct. 6, 2026

(54) ELECTRIC POWER MANAGEMENT SYSTEM

(71) Applicant: TOYOTA JIDOSHA KABUSHIKI KAISHA, Toyota (JP)

(72) Inventor: Tohru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 303 days.

(21) Appl. No.: 18/744,705

(22) Filed: Jun. 17, 2024

(65) Prior Publication Data

US 2025/0132598 A1 Apr. 24, 2025

(30) Foreign Application Priority Data

Oct. 19, 2023 (JP) ................................ 2023-180398

(51) Int. Cl.
*H02J 13/12* (2026.01)
*B60L 53/68* (2019.01)
*H02J 3/0012* (2026.01)
*H02J 3/32* (2006.01)

(52) U.S. Cl.
CPC .............. *H02J 13/12* (2026.01); *B60L 53/68* (2019.02); *H02J 3/0012* (2020.01); *H02J 3/322* (2020.01)

(58) Field of Classification Search
CPC ........ H02J 3/0012; H02J 3/007; H02J 3/0073; H02J 3/0075; H02J 3/322; H02J 13/12; H02J 13/13; H02J 13/14; H02J 2105/30; H02J 2105/33; H02J 2105/37; B60L 53/60; B60L 53/68; B60L 55/00
USPC .......................................................... 700/292
See application file for complete search history.

(56) References Cited

U.S. PATENT DOCUMENTS

| | | | | |
|---|---|---|---|---|
| 8,565,950 B2* | 10/2013 | Ishibashi | B60L 53/65 | |
| | | | 701/29.6 | |
| 10,131,246 B2* | 11/2018 | Demont | B60L 53/10 | |
| 10,549,644 B2* | 2/2020 | Kojima | B60L 53/62 | |
| 12,143,822 B2* | 11/2024 | Ehara | B60L 53/305 | |
| 2018/0011148 A1* | 1/2018 | Carlo | G01R 31/382 | |
| 2023/0001820 A1* | 1/2023 | Ehara | B60L 53/31 | |
| 2023/0004132 A1* | 1/2023 | Ehara | B60L 53/62 | |

(Continued)

FOREIGN PATENT DOCUMENTS

| | | | | |
|---|---|---|---|---|
| CN | 116890682 A * | 10/2023 | H02J 7/50 | |
| EP | 4342723 A1 * | 3/2024 | H01M 10/44 | |
| JP | 7045224 B2 * | 3/2022 | | |

(Continued)

*Primary Examiner* — Crystal J Barnes-Bullock
(74) *Attorney, Agent, or Firm* — SoraIP, Inc.

(57) ABSTRACT

A management server executes processing including a step (S302) of storing first data when receiving the first data via a DCM (YES in S300), a step (S308) of storing second data when receiving the second data via an indoor controller (YES in S304), a step (S314) of executing electric power control using the second data when the latest transmission times of both data do not coincide with each other (NO in S308), a step (S316) of determining that abnormality occurs on a system when the transmission times coincide with each other (YES in S308) and pieces of battery information do not coincide with each other (NO in S310), and a step (S312) of executing the electric power control using the first data and the second data when the pieces of battery information coincide with each other (YES in S310).

5 Claims, 6 Drawing Sheets

(56) References Cited

U.S. PATENT DOCUMENTS

2025/0141237 A1* 5/2025 Nakamura ................ H02J 7/40

FOREIGN PATENT DOCUMENTS

JP 2022-184741 A 12/2022
JP 2025026115 A * 2/2025 .............. B60L 53/31

* cited by examiner

FIG. 6

| | | TRANSMISSION TIME | |
|---|---|---|---|
| | | COINCIDENCE | DEVIATION |
| BATTERY INFORMATION (SOC) | COINCIDENCE | EXECUTE ELECTRIC POWER CONTROL IN COMBINATION OF FIRST DATA AND SECOND DATA | EXECUTE ELECTRIC POWER CONTROL USING SECOND DATA |
| | DISAGREEMENT | DETERMINE SYSTEM ABNORMALITY | EXECUTE ELECTRIC POWER CONTROL USING SECOND DATA |

ELECTRIC POWER MANAGEMENT SYSTEM

CROSS-REFERENCE TO RELATED APPLICATION

This application claims priority to Japanese Patent Application No. 2023-180398 filed on Oct. 19, 2023, incorporated herein by reference in its entirety.

BACKGROUND

1. Technical Field

The present disclosure relates to an electric power management system.

2. Description of Related Art

There is known an electric power management system that performs energy management in a power grid. To the power grid, for example, a vehicle on which a power storage apparatus is mounted is occasionally connected via a building. In order to control electric power of the power storage apparatus mounted on the vehicle, communication in accordance with various communication standards is occasionally performed between a server and the vehicle.

For example, Japanese Unexamined Patent Application Publication No. 2022-184741 (JP 2022-184741 A) discloses a technology of controlling a device, which performs communication in formats according to a plurality of communication standards, by conversion of the communication formats or the similar measure.

SUMMARY

Between the server and the vehicle as above, for example, not only the communication is occasionally performed through wireless communication, but also the communication is occasionally performed through wired communication when the power grid and the vehicle are connected with a cable or the like. When communication is performed through a plurality of communication paths as above, displacements in receiving timing and received contents occasionally occur depending on reliability of the individual communication paths. Therefore, information received in such a case is requested to be appropriately handled.

The present disclosure is devised in order to solve the aforementioned problem, and an object thereof is to provide an electric power management system that appropriately handles information acquired through different communication paths.

An electric power management system according to an aspect of the present disclosure includes: a vehicle that a power storage apparatus is mounted on; a transmission facility that performs electric power transmission between a power grid and the power storage apparatus; and a server that communicates with the vehicle. The server includes a communication apparatus that performs communication through at least any one communication path of a first communication path for communication between the vehicle and the server and a second communication path for communication between the transmission facility and the server, and a control apparatus that executes electric power control between the vehicle and the transmission facility. The control apparatus receives first data including information about the power storage apparatus on the first communication path, receives second data including the information on the second communication path, and when a first time when the first data is transmitted from the vehicle to the server and a second time when the second data is transmitted from the transmission facility to the server deviate from each other, executes the electric power control using the second data.

By doing so, when the first time when the first data is transmitted from the vehicle to the server and the second time when the second data including the equivalent information is transmitted from the transmission facility to the server deviate from each other, the first data transmitted through the first communication path lower in reliability than the second communication path is not used for the electric power control, and hence, control accuracy may be restrained from lowering. Therefore, information acquired through different communication paths may be appropriately handled.

In an embodiment, the control apparatus may determine that abnormality occurs on the electric power management system, when the first time and the second time coincide with each other and the first data and the second data do not coincide with each other in terms of the information acquired.

By doing so, since the system is in the state where the information of the power storage apparatus cannot be appropriately acquired, it may be determined with high accuracy that abnormality occurs on the electric power management system.

Furthermore, in an embodiment, when it is determined that the electric power management system is abnormal, the control apparatus may execute charging control of charging the power storage apparatus using the transmission facility.

By doing so, since charging of the power storage apparatus is at least performed, a user may quickly use the vehicle.

Furthermore, in an embodiment, the control apparatus may execute processing of reporting, when the charging control is executed due to the abnormality of the electric power management system, that the charging control is to be executed.

By doing so, the user may be caused to recognize that the power storage apparatus is to be charged. Thereby, charging timing may be adjusted in the case where the user wants the charging in other hours or the similar case.

Furthermore, in an embodiment, the control apparatus may execute the electric power control using the first data and the second data, when the first time and the second time coincide with each other and the first data and the second data coincide with each other in terms of the information acquired.

By doing so, since when a data amount included in the first data and a data amount included in the second data are different from each other, data complementation or the like between the first data and the second data may be performed, the electric power control may be executed with high accuracy.

According to the present disclosure, there may be provided an electric power management system that appropriately handle information acquired through different communication paths.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram showing examples of operation corresponding to the presence and absence of coincidences of transmission times and pieces of battery information.

DETAILED DESCRIPTION OF EMBODIMENTS

Figure 1:
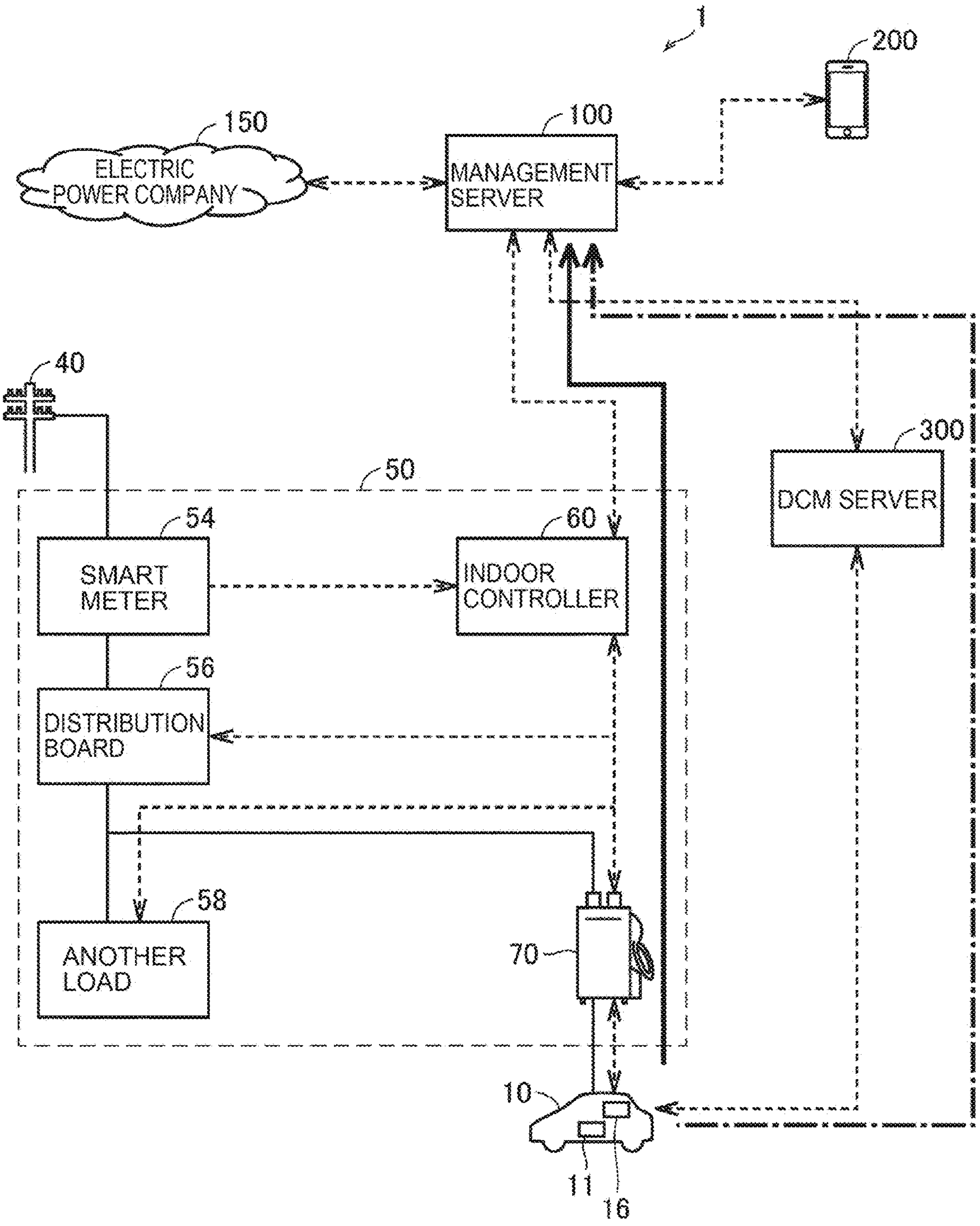
FIG. 1 is a diagram showing an example of a configuration of an electric power management system according to the present embodiment.

Hereafter, embodiments of the present disclosure will be described in detail with reference to the drawings. Notably, equivalent or corresponding portions in the drawings are given the same signs, and their description is not repeated.

FIG. 1 is a diagram showing an example of a configuration of an electric power management system 1 according to the present embodiment. As shown in FIG. 1, the electric power management system 1 includes a vehicle 10, an electric power system 40, a building 50, a management server 100, a terminal 200, and a data communication module (DCM) server 300.

The building 50 includes a smart meter 54, a distribution board 56, another load 58, an indoor controller 60, and electric vehicle supply equipment (EVSE) 70.

The smart meter 54 detects an electric power amount transmitted between the electric power system 40 and the building 50 (more specifically, the distribution board 56). For example, the smart meter 54 detects an electric power amount supplied from the electric power system 40 to the building 50. Furthermore, for example, the smart meter 54 detects an electric power amount supplied from the building 50 to the electric power system 40. The smart meter 54 transmits information indicating the detected electric power amounts to the indoor controller 60.

The distribution board 56 enables voltage of electric power supplied from the electric power system 40 to be supplied to the EVSE 70 and various electric devices including the other load 58. In the distribution board 56, an interruption circuit, such as a breaker, that can interrupt electric power supply to the various electric devices is provided. For example, the other load 58 is provided in the building 50 and includes various electric devices (for example, home appliances) other than the EVSE 70.

The indoor controller 60 is a control apparatus for managing the electric power supplied to the various electric devices in the building 50 from the electric power system 40 via the distribution board 56, and the electric power supplied to the electric power system 40 from any of power sources in the building 50 via the distribution board 56. The indoor controller 60 is configured to be able to acquire information from the smart meter 54 and various electric devices (such, for example, as the EVSE 70 mentioned later) connected as control targets and to be able to transmit various control commands (such, for example, as an execution command of charging control) to the various electric devices.

The EVSE 70 is a transmission facility that is configured to be connectable to the vehicle 10 using a connector and a cable and can perform electric power transmission. In response to a control signal from the indoor controller 60, the EVSE 70 supplies electric power supplied from the distribution board 56 to the vehicle 10 and outputs electric power supplied from the vehicle 10 to the distribution board 56. The EVSE 70 may be configured to supply DC electric power to the power storage apparatus 11 mounted on the vehicle 10 or may be configured to supply AC electric power to a rechargeable apparatus mounted on the vehicle 10 and to allow the rechargeable apparatus to perform conversion to DC electric power to be supplied to the power storage apparatus 11.

The vehicle 10 is an electrified vehicle having the power storage apparatus 11 configured of a rechargeable DC power supply, a drive line (not shown) configured of a motor and the like, and a communication apparatus 16 including a DCM. For example, the power storage apparatus 11 may be a secondary battery such as a nickel-metal hydride battery or a lithium-ion battery having liquid or solid electrolyte, or may be a capacitor or the like. The vehicle 10 is configured to be able to charge the power storage apparatus 11 using the electric power supplied from the EVSE 70. Moreover, the vehicle 10 is configured to be able to supply electric power of the power storage apparatus 11 to the EVSE 70. Furthermore, the vehicle 10 is configured to be able to perform communication (for example, wireless communication) with the DCM server 300 using the communication apparatus 16 (specifically, the DCM). Moreover, the vehicle 10 is configured to be able to perform communication (for example, wired communication) with the EVSE 70 via the connector and the cable using the communication apparatus 16 when the connector of the EVSE 70 is connected to an inlet (not shown) of the vehicle 10. Notably, although in FIG. 1, the vehicle 10 is representatively illustrated, a plurality of vehicles other than the vehicle 10 may be connected to pieces of EVSE other than the EVSE 70.

Upon reception of a supply and demand request for electric power from the electric power company 150, the management server 100 performs supply and demand management of electric power in a power grid formed in a predefined area including the building 50. For example, when requested to increase supply of electric power by the electric power company 150, the management server 100 transmits a control command to supply electric power to electric power system 40, to control targets that can supply the electric power in the power grid, the control targets including the building 50. As to the control targets in the power grid, an increase of the electric power supplied to the electric power system 40 in accordance with the control command can fulfill the request of the electric power company 150.

The terminal 200 is a mobile terminal carried by an owner of the vehicle 10. The terminal 200 is configured to be able to communicate with the management server 100 via a communication network (not shown). On the terminal 200, a display apparatus is provided, and various kinds of information (character information or image information) is displayed based on information transmitted from the management server 100.

The DCM server 300 is configured to be able to communicate with a plurality of vehicles (including vehicle 10) on which DCMs are mounted. For example, the DCM server 300 receives information regarding mounted power storage apparatuses from the plurality of vehicles on which the DCMs are mounted, or transmits update information of various control programs and the like to the plurality of vehicles on which the DCMs are mounted. The information regarding the power storage apparatuses received by the DCM server 300 includes information about states of charge (SOCs) of the power storage apparatuses, information about chargeable electric power amounts, information about dischargeable electric power amounts, and the like.

The vehicle 10, the indoor controller 60, the EVSE 70, the management server 100, the terminal 200, and the DCM server 300 are configured to transmit and receive various kinds of information through communication.

Figure 2:
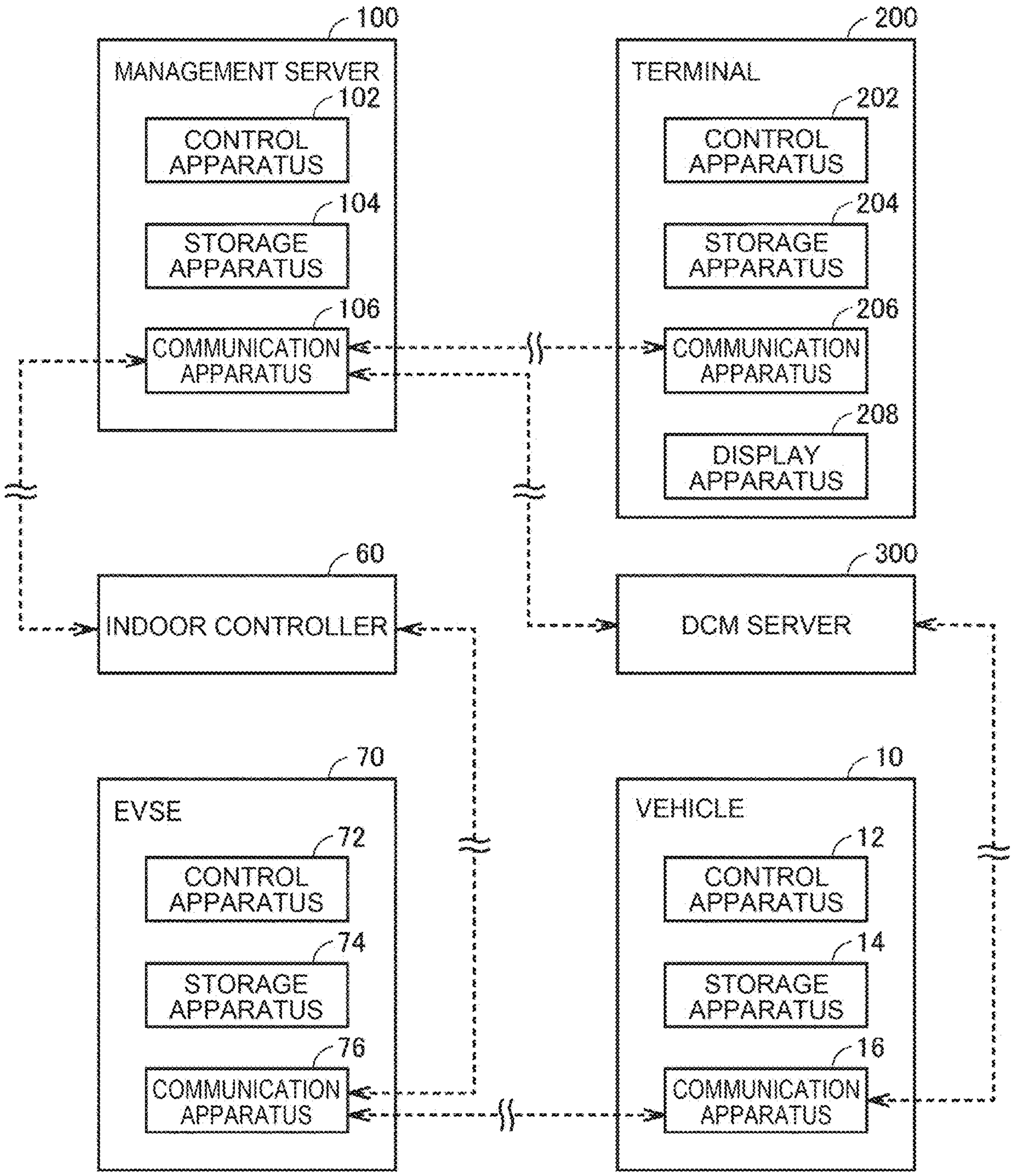
FIG. 2 is a diagram showing an example of a configuration of communication of the electric power management system according to the present embodiment.

FIG. 2 is a diagram showing an example of a configuration of communication of the electric power management system 1 according to the present embodiment. As shown in FIG. 2, the vehicle 10 includes an electronic control unit (ECU) 12, a storage apparatus 14, and the communication apparatus 16. The ECU 12 has a central control unit (CPU) and a memory (such as a read-only memory (ROM) and a random access memory (RAM)), which are not shown, and executes power supplying processing of supplying the electric power of the power storage apparatus 11 to the EVSE 70, or charging processing of charging the power storage apparatus 11 using the electric power from the EVSE 70, based on various kinds of information stored in the memory and various kinds of information acquired through the communication. The various kinds of information include a charging command and a discharging command from the EVSE 70. The storage apparatus 14 stores the various kinds of information received using the communication apparatus 16 and predefined information. The communication apparatus 16 includes the DCM that can perform wireless communication with the DCM server 300 via a not-shown communication network (such, for example, as a mobile phone line), a communication unit (not shown) that can perform wired communication (such, for example, as power line communication (PLC) communication and controller area network (CAN) communication) with the EVSE 70.

The indoor controller 60 has a CPU and a memory, which are not shown, and executes processing regarding supply and demand management of electric power in the building 50, based on various kinds of information stored in the memory and various kinds of information acquired through communication with the EVSE 70 and the management server 100. For example, the processing regarding supply and demand management of electric power in the building 50 includes processing of transmitting an execution command of charging processing (charging command) to the EVSE 70, and processing of transmitting an execution command of discharging processing (discharging command). In response to a request from the management server 100, the indoor controller 60 transmits information about the power storage apparatus 11 mounted on the vehicle 10 which is a control target of electric power management by the management server 100 in the power grid, to the management server 100. Otherwise, the indoor controller 60 may transmit the information about the power storage apparatus 11 to the management server 100 regardless of the presence or absence of the request from the management server 100 when receiving the relevant information from the vehicle 10.

The EVSE 70 includes a control apparatus 72, a storage apparatus 74, and a communication apparatus 76. The control apparatus 72 has a CPU and a memory, which are not shown, and transmits the charging command to the vehicle 10 or transmits the discharging command to the vehicle 10, based on various kinds of information stored in the memory and various kinds of information acquired through communication. The storage apparatus 74 stores various kinds of information received using the communication apparatus 76 and predefined information. The communication apparatus 76 is configured to be able to perform communication with the indoor controller 60 or with the vehicle 10 via the communication network in a wireless or wired manner.

The management server 100 includes a control apparatus 102, a storage apparatus 104, and a communication apparatus 106. The control apparatus 102 has a CPU and a memory, which are not shown, and performs processing regarding supply and demand management in the power grid, based on various kinds of information stored in the memory and various kinds of information acquired through communication. For example, the processing regarding supply and demand management in the power grid includes processing of transmitting the charging command and processing of transmitting the discharging command to the indoor controller 60. Moreover, the management server 100 acquires information for performing the supply and demand management (for example, the information regarding the power storage apparatus 11 mounted on the vehicle 10) from the indoor controller 60 and the DCM server 300.

The storage apparatus 104 stores various kinds of information received using the communication apparatus 106 and predefined information. For example, the storage apparatus 104 stores information (such, for example, as a vehicle number and a frame number) for specifying a vehicle that is a control target in the supply and demand management in the power grid. These pieces of information are used for the management server 100 acquiring information about the vehicle 10 from the DCM server 300.

The communication apparatus 106 is configured to be able to perform communication with the terminal 200, with the DCM server 300, or with the indoor controller 60 via a not-shown communication network (for example, the Internet, an exclusive line, or the like) in a wireless or wired manner.

The terminal 200 includes a control apparatus 202, a storage apparatus 204, a communication apparatus 206, and a display apparatus 208. The control apparatus 202 has a CPU and a memory, which are not shown, and executes display processing based on various kinds of information stored in the memory and various kinds of information acquired through communication. The storage apparatus 104 stores various kinds of information received using the communication apparatus 206 and predefined information. The communication apparatus 206 is configured to be able to perform communication with the management server 100 via a not-shown communication network (for example, a mobile phone line, the Internet, or the like) in a wireless manner. The display apparatus 208 displays character information, an image, and/or the like in accordance with a control signal from the control apparatus 202.

The DCM server 300 has a CPU and a memory, which are not shown, and executes processing of transmitting and receiving information regarding the power storage apparatus from/to each of the plurality of vehicles, based on various kinds of information stored in the memory and various kinds of information acquired through communication with the plurality of vehicles and the management server 100. In response to a request from the management server 100, the DCM server 300 transmits information about the power storage apparatus 11 mounted on the vehicle 10 which is a control target of electric power management by the management server 100 in the power grid, to the management server 100. Otherwise, the DCM server 300 may transmit the information about the power storage apparatus 11 to the management server 100 regardless of the presence or absence of the request from the management server 100 when receiving the relevant information from the vehicle 10.

In the electric power management system 1 having the configuration of communication as above, the communicable devices perform communication with one another in accordance with various communication standards.

In order to estimate chargeable and dischargeable amounts as to a plurality of vehicles in the power grid, the management server 100 acquires information (for example, information of states of charge (SOCs) and the like) on the power storage apparatuses from the plurality of vehicles including the vehicle 10.

The information about the power storage apparatus is transmitted through at least any one of a first communication path (the dot and dash arrow in FIG. 1) reaching the management server 100 via the DCM server 300 not via the EVSE 70, and a second communication path (the solid arrow in FIG. 1) reaching the management server 100 via the EVSE 70 and the indoor controller 60.

For example, when not connected to the EVSE 70, the ECU 12 of the vehicle 10 transmits the information about the power storage apparatus 11 to the management server 100 through the first communication path. On the other hand, for example, when connected to the EVSE 70, the ECU 12 of the vehicle 10 transmits the information about the power storage apparatus 11 to the management server 100 individually through the first communication path and the second communication path.

When data including equivalent information are transmitted through both paths, data different in timing or different in content are occasionally received depending on reliability of the individual communication paths. When a path, such as a mobile phone line, through which wireless communication is performed is included between the communication apparatus 16 and the DCM server 300, a delay, an interruption, or the like can occur on the communication from the communication apparatus 16 to the DCM server 300 when an electric wave condition deteriorates in the vehicle 10 travelling or stopping in a tunnel or underground more than in the normal state. As a result, when information is transmitted through the first communication path, as compared with the case where the information is transmitted through the second communication path, data different in timing of information or different in content can be received by the management server 100. In this case, the received data is requested to be appropriately handled.

Therefore, in the present embodiment, the management server 100 is configured, when a first time when first data including information regarding the power storage apparatus 11 is transmitted from the vehicle 10 to the management server 100 through the first communication path and a second time when second data including the relevant information is transmitted from the EVSE 70 to the management server 100 deviate from each other, to execute electric power control regarding supply and demand management using the second data.

By doing so, when the first time when the first data is transmitted from the vehicle 10 to the management server 100 and the second time when the second data including the equivalent information is transmitted from the EVSE 70 to the management server 100 deviate from each other, the first data lower in reliability than the second data through the second communication path is not used for the electric power control, and thus control accuracy of the electric power control in supply and demand management can be restrained from lowering. Therefore, information acquired through different communication paths can be appropriately handled.

Figure 3:
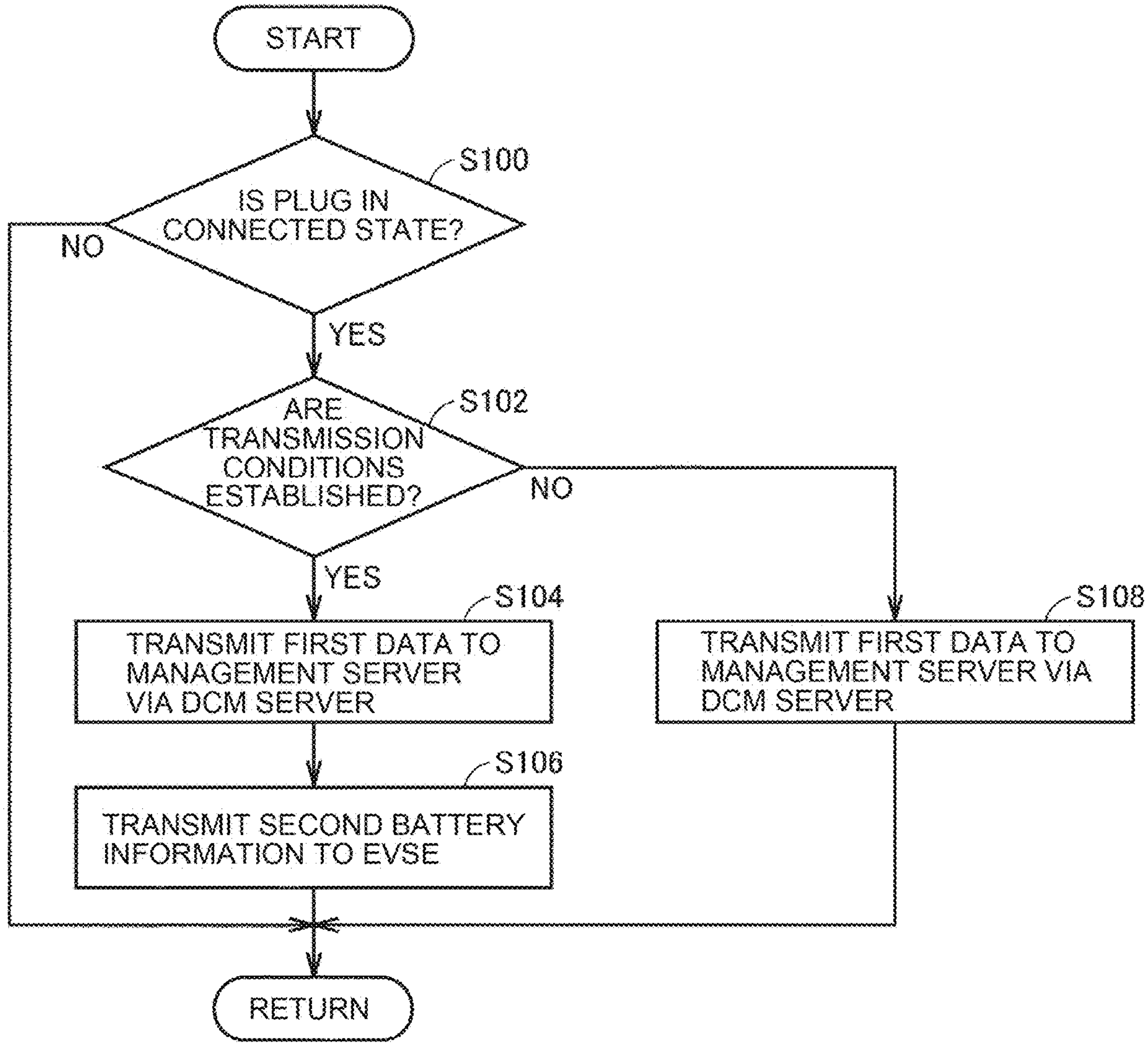
FIG. 3 is a flowchart showing an example of processing executed by a vehicle.
Figure 4:
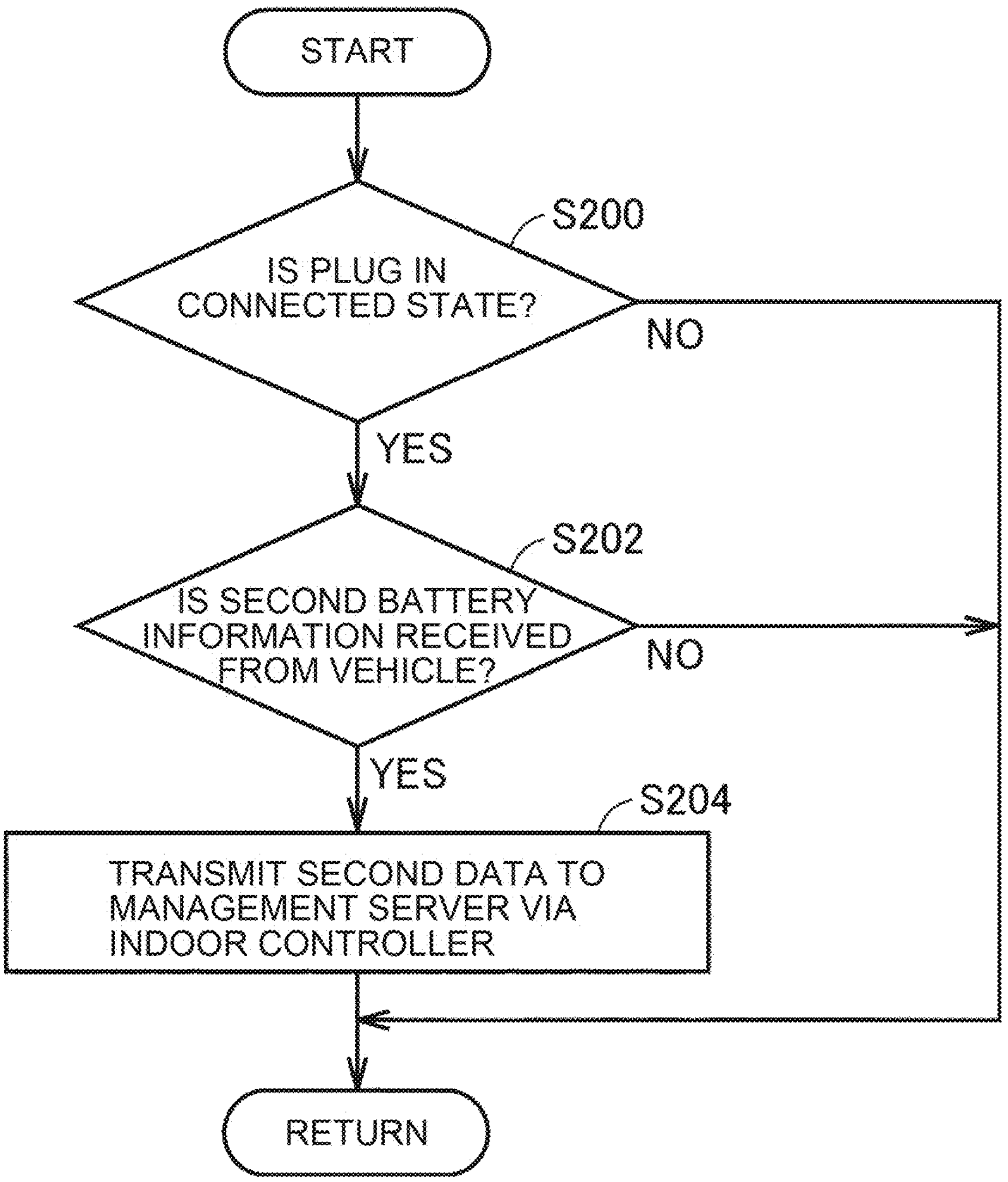
FIG. 4 is a flowchart showing an example of processing executed by EVSE.
Figure 5:
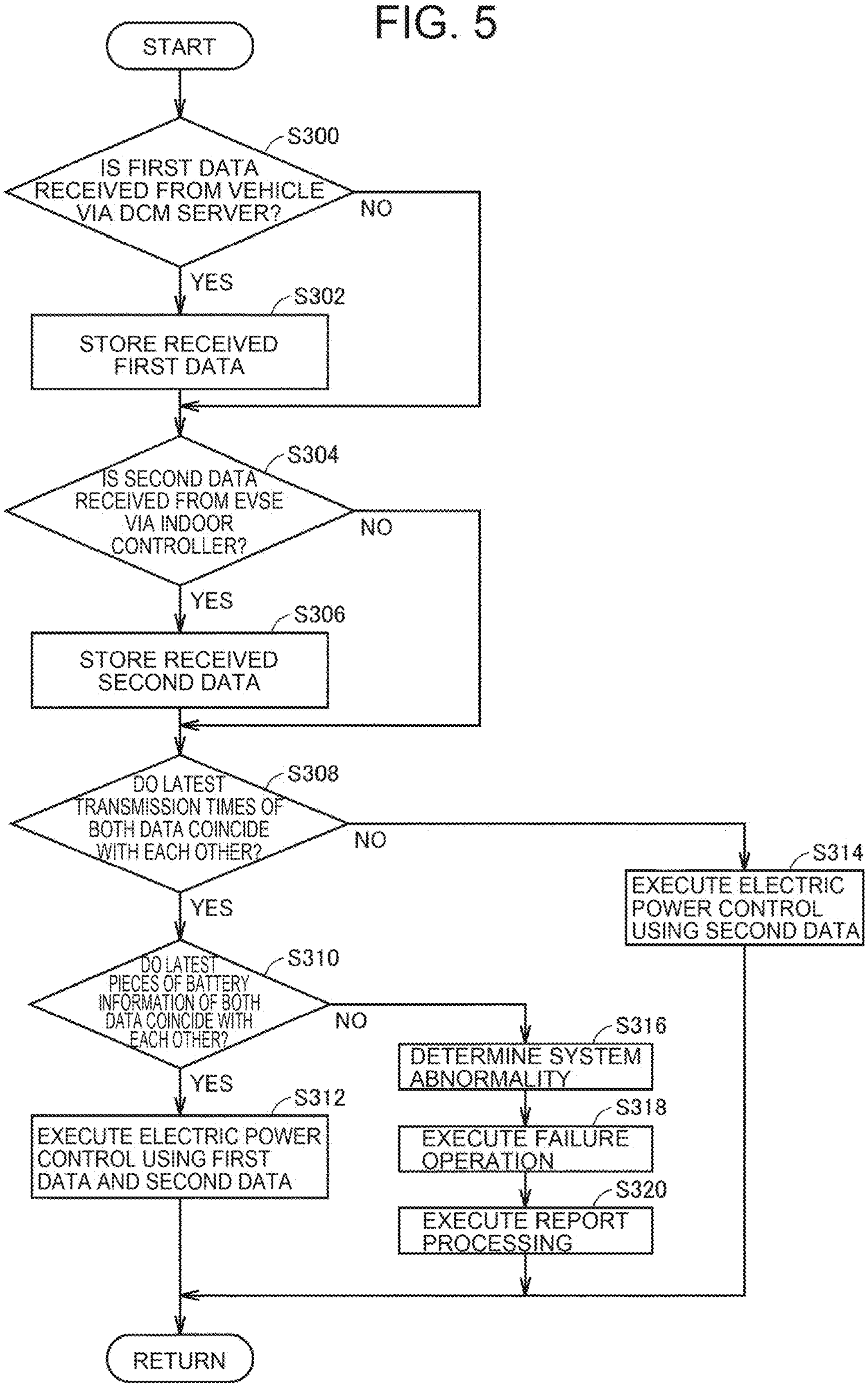
FIG. 5 is a flowchart showing an example of processing executed by a management server.

Hereafter, processing executed by (the ECU 12 of) the vehicle 10 is described with reference to FIG. 3. FIG. 3 is a flowchart showing an example of processing executed by the vehicle 10. Notably, a series of processes shown in flowcharts of FIG. 3 to FIG. 5 are repeatedly executed in predetermined cycles.

In step ("step" is hereinafter expressed as "S") 100, the ECU 12 determines whether or not a plug is in a connected state. For example, the ECU 12 may determine that the plug is in the connected state, in the case where the connector of the EVSE 70 is connected to the inlet of the vehicle 10. For example, the ECU 12 may determine that the connector is connected, when receiving an ON-signal from a circuit (not shown) that outputs the ON-signal when the connector is connected to the inlet. When it is determined that the plug is in the connected state (YES in S100), the process is moved to S102.

In S102, the ECU 12 determines whether or not transmission conditions are established. For example, the transmission conditions may include a first condition that a transmission request is received from the management server 100. Otherwise, the transmission conditions include a second condition that a predefined time elapses from previous transmission timing. Otherwise, the transmission conditions may include at least any one of the first condition and the second condition. When it is determined that the transmission conditions are established (YES in S102), the process is moved to S104.

In S104, the ECU 12 transmits the first data including a transmission time (hereinafter expressed as first time) and information (hereinafter expressed as first battery information) on the SOC of the power storage apparatus 11, to the management server 100 via the DCM server 300 using the communication apparatus 16. The ECU 12 sets the transmission time when the first data is transmitted to the DCM server 300 as the first time. After that, the process is moved to S106.

In S106, the ECU 12 transmits information (hereinafter expressed as second battery information) on the SOC of the power storage apparatus 11, to the EVSE 70 using the communication apparatus 16. After that, the process is ended. Notably, when it is determined that the transmission conditions are not established (NO in S102), the process is moved to S108.

In S108, the ECU 12 transmits the first data to the management server 100 via the DCM server 300 using the communication apparatus 16. After that, the process is ended. Notably, when it is determined that the plug is not in the connected state (NO in S100), this process is ended.

Next, processing executed by (the control apparatus 72 of) the EVSE 70 is described with reference to FIG. 4. FIG. 4 is a flowchart showing an example of processing executed by the EVSE 70.

In S200, the control apparatus 72 determines whether or not the plug is in the connected state. For example, the control apparatus 72 may determine that the plug is in the connected state, when the connector is connected to the inlet of the vehicle 10. For example, the control apparatus 72 may determine that the connector is connected, when receiving a signal indicating that the connector is connected to the inlet from the vehicle 10 through wired communication via the cable or through wireless communication. When it is determined that the plug is in the connected state (YES in S200), the process is moved to S202.

In S202, the control apparatus 72 determines whether or not the second battery information is to be received from the vehicle 10. When it is determined that the second battery information is received from the vehicle 10 (YES in S202), the process is moved to S204.

In S204, the control apparatus 72 transmits the second data including a transmission time (hereinafter expressed as second time) and the second battery information, to the management server 100 via the indoor controller 60. The control apparatus 72 sets the transmission time of transmission to the indoor controller 60 as the second time. After that, the process is ended. Notably, when it is determined that the plug is not in the connected state (NO in S200) or when it is determined that the second battery information is not to be received from the vehicle 10 (NO in S202), the process is ended.

Next, process executed by the control apparatus 102 of the management server 100 is described with reference to FIG. 5. FIG. 5 is a flowchart showing an example of processing executed by the management server 100.

In S300, the control apparatus 102 determines whether or not the first data is received from the vehicle 10 via the DCM server 300. When it is determined that the first data is received from the vehicle 10 via the DCM server 300 (YES in S300), the process is moved to S302.

In S302, the control apparatus 102 stores the received first data in the storage apparatus 104. After that, the process is moved to S304.

In S304, the control apparatus 102 determines whether or not the second data is received from the EVSE 70 via the indoor controller 60. When it is determined that the second data is received via the indoor controller 60 (YES in S304), the process is moved to S306.

In S306, the control apparatus 102 stores the received second data in the storage apparatus 104. After that, the process is moved to S308.

In S308, the control apparatus 102 determines whether or not the latest transmission times of both data received through both paths (the first communication path and the second communication path) coincide with each other. For example, the control apparatus 102 determines that the latest transmission times coincide with each other, when a magnitude of a difference between the first time on the latest first data and the second time on the latest second data is not more than a threshold. An example of the threshold is a predefined value such, for example, as a value of about minutes. When it is determined that the latest transmission times coincide with each other (YES in S308), the process is moved to S310.

In S310, the control apparatus 102 determines whether or not the pieces of battery information of both data received through both paths coincide with each other. For example, the control apparatus 102 determines that the pieces of battery information coincide with each other, when a value of the SOC included in the latest first battery information and a value of the SOC included in the latest second battery information are an equivalent value. When it is determined that the pieces of battery information of both data received through both paths coincide with each other (YES in S310), the process is moved to S312.

In S312, the control apparatus 102 executes electric power control using the first data and the second data. The electric power control includes the electric power control regarding supply and demand management. When the first data is acquired from the DCM server 300 so as to include more detailed information than the second data, the control apparatus 102 complements the second data using the first data and estimates the SOC and a change of the SOC with high accuracy using the first data and the second data. Thereby, the supply and demand management of the electric power in the power grid in accordance with the supply and demand request from the electric power company 150 can be performed. After that, the process is ended. On the other hand, when it is determined that the latest transmission times deviate from each other (NO in S308), the process is moved to S314.

In S314, the control apparatus 102 executes electric power control using the second data. Since this electric power control is as mentioned above except that the first data is not used, the detailed description is not repeated. After that, the process is ended. When it is determined that the pieces of battery information of both data do not coincide with each other (NO in S310), the process is moved to S316.

In S316, the control apparatus 102 determines that abnormality occurs on the electric power management system 1. When the power storage apparatus 11 mounted on the vehicle 10 cannot be used for the supply and demand management of the electric power, the control apparatus 102 determines that the abnormality occurs. After that, the processing is moved to S318.

In S318, the control apparatus 102 executes failure operation. Specifically, the control apparatus 102 transmits, to the vehicle 10 via the indoor controller 60 and the EVSE 70, the execution command of charging processing of charging the power storage apparatus 11 mounted on the vehicle 10 that is a determination target of the abnormality into a predetermined charging state (for example, a fully charged state). After that, the process is moved to S320.

In S320, the control apparatus 102 executes report processing. Specifically, the control apparatus 102 transmits, to the terminal 200, a control command for displaying that the power storage apparatus 11 is to be charged due to abnormality occurrence on the electric power management system 1. After that, the process is ended.

Operation of the electric power management system 1 according to the present embodiment based on the configuration and the flowcharts as above is described. For example, when the vehicle 10 is in the state where the plug is in the connected state (YES in S100) and the transmission conditions are established due to reaching the predefined time or the similar situation (YES in S102), the first data including the first time and the first battery information is transmitted to the management server 100 via the DCM server 300 (S104). Furthermore, the second battery information is transmitted to the EVSE 70 via the connector and the cable (S106).

At the EVSE 70, when, when the plug is in the connected state (YES in S200), the second battery information is received from the vehicle 10, the second data including the second time and the second battery information is transmitted to the management server 100 via the indoor controller 60 (S204).

In the Case Where Each of Both Transmission Times and Both Pieces of Battery Information Coincide When the first data is received from the vehicle 10 via the DCM server 300 (YES in S300), the received first data is stored in the storage apparatus 104 (S302). Meanwhile, when the second data is received from the EVSE 70 via the indoor controller 60 (YES in S304), the received second data is stored in the storage apparatus 104 (S306).

Then, it is determined whether or not the first time included in the latest first data and the second time included in the latest second data coincide with each other (S308). When it is determined that the magnitude of the difference between the first time and the second time is not more than a threshold (YES in S308), it is determined whether or not the first battery information and the second battery information coincide with each other (S310). For example, when the value of the SOC included in the first battery information and the value of the SOC included in the second battery information are an equivalent value, it is determined that the first battery information and the second battery information coincide with each other (YES in S310). Therefore, the electric power control is executed using the first data and the second data (S312).

In the Case Where Only Both Transmission Times Coincide

When it is determined that the first time and the second time coincide with each other since the magnitude of the difference between the first time and the second time is not more than the threshold (YES in S308), it is determined whether or not the first battery information and the second battery information coincide with each other (S310). For example, when the value of the SOC included in the first battery information and the value of the SOC included in the second battery information are not an equivalent value, it is determined that the first battery information and the second battery information do not coincide with each other (NO in S310). Then, it is determined that abnormality occurs on the system (S316), and the failure operation is executed (S318). In this stage, the execution command of charging processing of charging the power storage apparatus 11 of the vehicle 10 is transmitted to the vehicle 10. Upon reception of the execution command of the charging processing, the ECU 12 of the vehicle 10 executes the charging processing to charge the power storage apparatus 11. The report processing is executed (S320), and character information and/or image information that the power storage apparatus 11 is charged due to the abnormality on the system is displayed on the display apparatus 208 of the terminal 200.

In the Case Where Both Transmission Times Do Not Coincide

When the first data is not received from the vehicle 10 via the DCM server 300 (NO in S300) and the second data is received from the EVSE 70 via the indoor controller 60 (YES in S304), the received second data is stored in the storage apparatus 104 (S306).

Therefore, the magnitude of the difference between the first time of the latest first data and the second time of the latest second data exceeds the threshold, and it is determined that the first time and the second time deviate from each other (NO in S308). As a result, the electric power control is executed using only the second data (S314).

FIG. 6 is a diagram showing examples of operation corresponding to the presence and absence of coincidences of the transmission times and the pieces of battery information. As shown in FIG. 6, when the latest transmission times disagree with each other, the electric power control using the second data is executed regardless of the coincidence or disagreement of the values of the battery information (SOCs). On the other hand, when the latest transmission times coincide with each other and the latest values of the battery information coincide with each other, the electric power control using the first data and the second data is executed. Moreover, when the latest transmission times coincides with each other and the latest values of the battery information do not coincide with each other, it is to be determined that abnormality occurs on the electric power management system 1.

As above, according to the electric power management system 1 according to the present embodiment, when the first time when the first data is transmitted from the vehicle 10 to the management server 100 and the second time when the second data including the equivalent information is transmitted from the EVSE 70 to the management server 100 deviate from each other, the first data through the first communication path lower in reliability than the second communication path is not used for the electric power control, and hence, control accuracy of the electric power control in the supply and demand management can be strained from lowering. Accordingly, there can be provided an electric power management system that appropriately handles information acquired through different communication paths.

Furthermore, since when the first time and the second time coincide with each other and the first battery information and the second battery information do not coincide with each other, the system is in the state where the information of the power storage apparatus 11 cannot be appropriately acquired, it can be determined with high accuracy that abnormality occurs on the electric power management system 1.

Furthermore, since when it is determined that abnormality occurs on the electric power management system 1, the power storage apparatus 11 is charged, a user can quickly use the vehicle 10.

Furthermore, since it is reported to the terminal 200 that charging control is executed due to abnormality of the electric power management system, a user of the terminal can be caused to recognize that the power storage apparatus is charged. Thereby, in the case where the user wants the charging in other hours or the similar case, charging timing can be adjusted.

Furthermore, since when the first time and the second time coincide with each other and the first battery information and the second battery information coincide with each other, the electric power control regarding the supply and demand management is executed using the first data and the second data, the electric power control can be executed with high accuracy with data complementation or the like of the second data using the first data.

Hereafter, modifications are described.

Although in the aforementioned embodiment, there has been described as an example the case where, when abnormality occurs on the electric power management system 1, it is reported on the terminal 200 that the power storage apparatus 11 is being charged due to the abnormality of the electric power management system 1, the reporting may be performed using a display apparatus in the cabin of the vehicle 10, in place of or in addition to the terminal 200 as the destination of the reporting.

Furthermore, although in the aforementioned embodiment, there has been described as an example the case where the battery information includes the SOC of the power storage apparatus 11, for example, it may include at least any one of a dischargeable capacity, a chargeable capacity, a current dischargeable electric power amount, and a current chargeable electric power amount, in place of or in addition to the SOC.

Furthermore, although in the aforementioned embodiment, the vehicle 10 has been described as an example of a control target of the management server 100, it may be determined, in the case where a plurality of vehicles is a control target, for each vehicle whether or not the transmission times and the pieces of battery information coincide with each other, and the operation as shown in FIG. 6 may be performed in accordance with the determination result.

Notably, all of or one or some of the aforementioned modifications may be properly combined and implemented.

It should be construed that the embodiment disclosed here is an exemplary illustration in all respects and is not restrictive. The scope of the present disclosure is shown by the claims, not by the aforementioned description, and includes all alterations in the spirit and the scope of the claims and their equivalents.

What is claimed is:

1. An electric power management system comprising:

a vehicle that a power storage apparatus is mounted on;

a transmission facility that performs electric power transmission between a power grid and the power storage apparatus; and a server that communicates with the vehicle, wherein the server includes a communication apparatus that performs communication through at least any one communication path of a first communication path for communication between the vehicle and the server and a second communication path for communication between the transmission facility and the server, and a control apparatus that executes electric power control between the vehicle and the transmission facility, and the control apparatus receives first data including information about the power storage apparatus on the first communication path, receives second data including the information on the second communication path, and when a first time when the first data is transmitted from the vehicle to the server and a second time when the second data is transmitted from the transmission facility to the server deviate from each other, executes the electric power control using the second data.

2. The electric power management system according to claim 1, wherein the control apparatus determines that abnormality occurs on the electric power management system, when the first time and the second time coincide with each other and the first data and the second data do not coincide with each other in terms of the information acquired.

3. The electric power management system according to claim 2, wherein, when is determined that the electric power management system is abnormal, the control apparatus executes charging control of charging the power storage apparatus using the transmission facility.

4. The electric power management system according to claim 3, wherein the control apparatus executes processing of reporting, when the charging control is executed due to the abnormality of the electric power management system, that the charging control is to be executed.

5. The electric power management system according to claim 1, wherein the control apparatus executes the electric power control using the first data and the second data, when the first time and the second time coincide with each other and the first data and the second data coincide with each other in terms of the information acquired.

* * * * *